Figure 1:
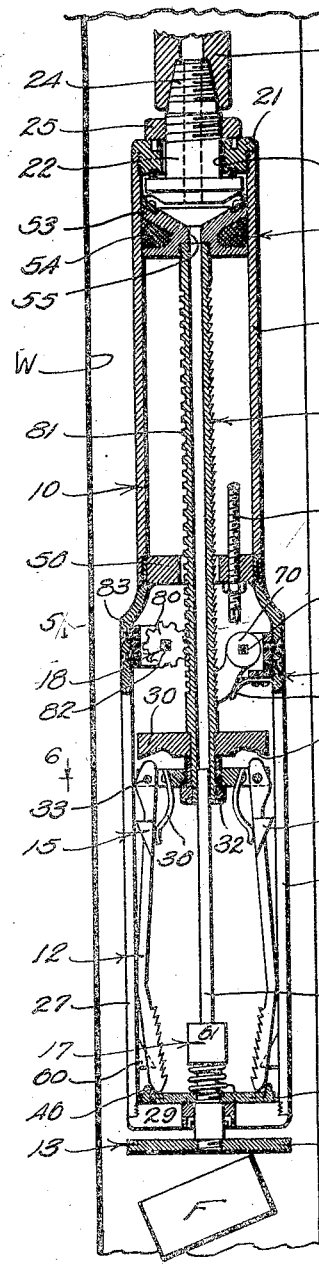

May 19, 1931.    J. G. FITZPATRICK    1,805,815
FISHING TOOL
Filed March 5, 1930    2 Sheets-Sheet 1

Inventor
Joseph G. Fitzpatrick
by Wm Alldwell
His Attorney

May 19, 1931.                J. G. FITZPATRICK                1,805,815
                                 FISHING TOOL
                     Filed March 5, 1930        2 Sheets-Sheet 2
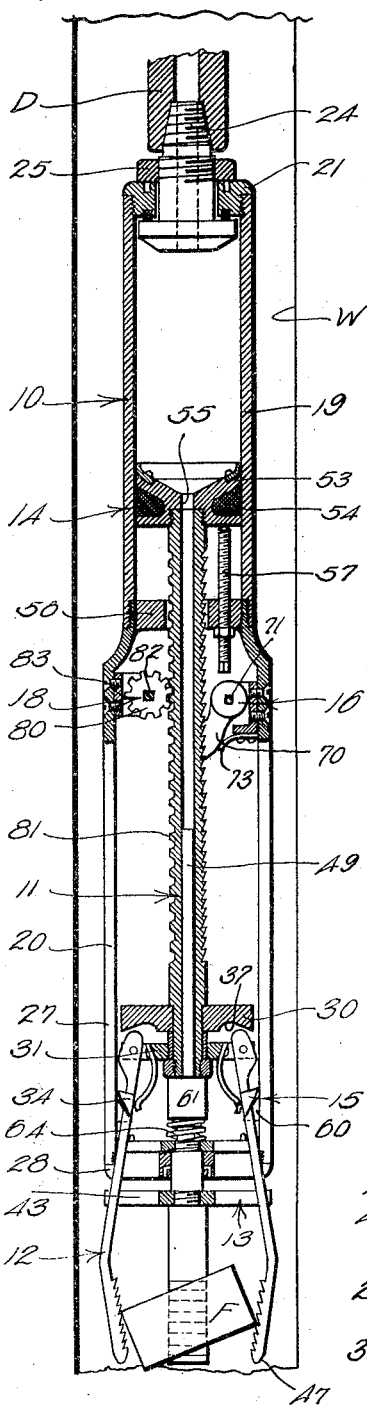
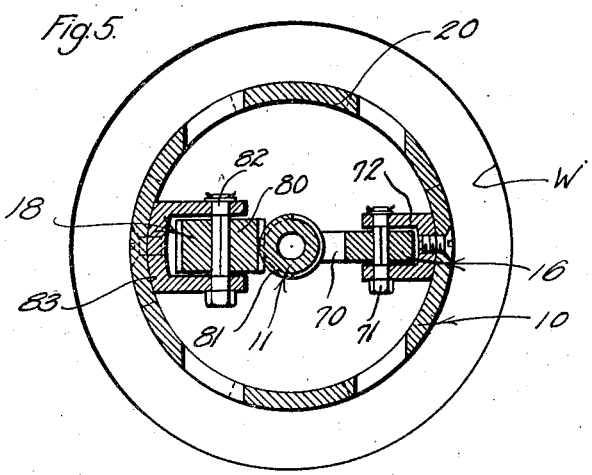
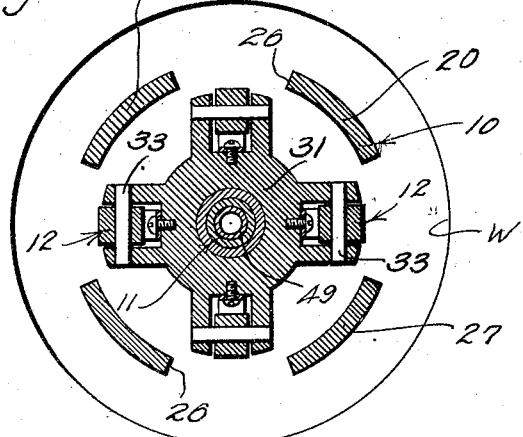
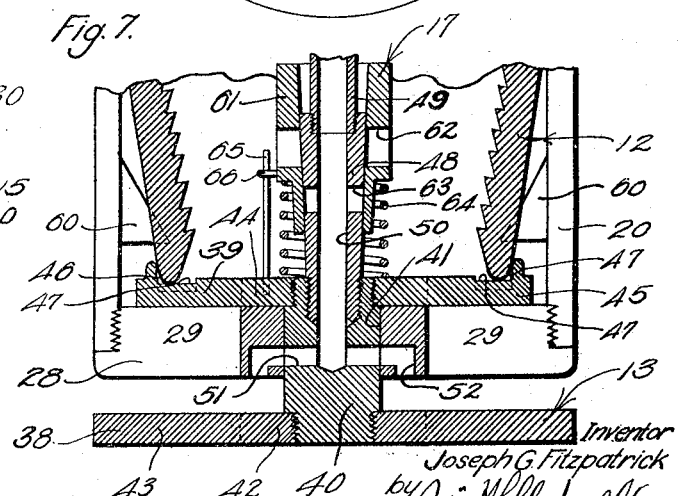
Inventor
Joseph G. Fitzpatrick
by His Attorney Patented May 19, 1931

1,805,815

UNITED STATES PATENT OFFICE

JOSEPH G. FITZPATRICK, OF ANAHEIM, CALIFORNIA

FISHING TOOL

Application filed March 5, 1930. Serial No. 433,268.

This invention relates to a well tool and relates more particularly to a fishing tool for fishing or removing objects or lost parts from a well.

It is a general object of the invention to provide an improved grab or fishing tool of the general character set forth in my copending application entitled Grab, Serial Number 360,671, filed May 6, 1929.

Various types of devices are employed to remove or fish objects such as parts of well drilling equipment from deep wells. Devices commonly known as grabs are used to fish or remove various small objects from wells. The usual forms of grabs employed with the equipment used in the rotary method of well drilling embody gripping arms or fingers that are operated to grip the lost parts by rotating the tool through a drilling or operating string. The gripping arms of the common forms of grabs are mounted or carried so that they are rotated when operated into gripping position, and are often bent or distorted when operated in this manner and are made inoperative and incapable of gripping the fish.

It is an object of the invention to provide a fishing tool in the form of a grab in which the gripping arms are operated into gripping engagement with a fish by fluid pressure without being rotated or turned and subjected to rotational strains.

Another object of the invention is to provide a grab that embodies means whereby the driller or operator is made aware of the various steps or states of operation of the grab from the time that it is in position where the gripping arms are operable to grip the fish until the arms have been fully operated to their gripping position.

Another object of the invention is to provide a grab that embodies improved means for controlling the flow of circulation fluid to aid in the operation of the tool and to flush around the fish.

It is another object of the invention to provide a grab that is operable to grip a fish or lost part of comparatively large size or diameter.

A feature of the invention is to provide a grab in which the gripping arms are normally carried within a body and are operable outwardly from the body, downwardly, and then inwardly to grip a fish. The arms mounted and operated in this manner are protected during the lowering of the tool into the well and are operable to grip a comparatively large object.

Figure 2:
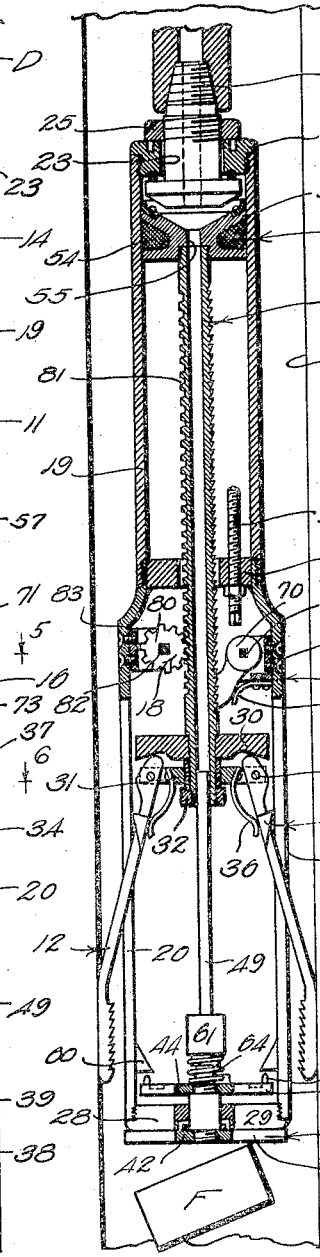
Figure 3:
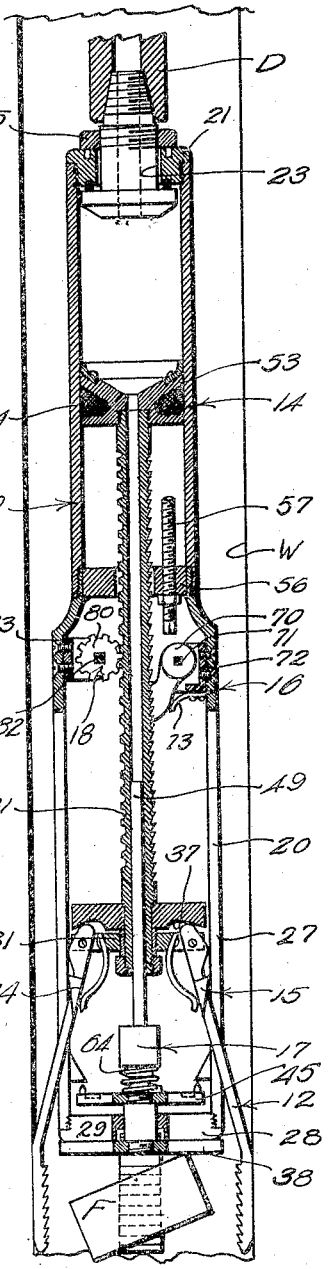

The various objects and features of my invention will be best and more fully understood from the following detailed description of a typical preferred form and application of the invention, throughout which description reference is had to the accompanying drawings, in which:

Fig. 1 is a vertical or longitudinal detailed sectional view of the grab provided by the present invention illustrating it within a well bore with the parts in the normal or unactuated positions. Fig. 2 is a view similar to Fig. 1 illustrating the arms in the out or released position. Fig. 3 is a view similar to Fig. 1 showing the arms partially operated. Fig. 4 is a view similar to Fig. 1 illustrating the arms in the gripping positions. Fig. 5 is an enlarged detailed transverse sectional view taken as indicated by line 5—5 on Fig. 1. Fig. 6 is an enlarged transverse detailed sectional view taken as indicated by line 6—6 on Fig. 1, and Fig. 7 is an enlarged vertical detailed sectional view of the lower portion of the grab illustrating the parts in the normal or unactuated position.

The tool provided by this invention is intended primarily to be employed to remove or fish lost parts or objects from a well. In the following detailed disclosure I will describe a form of the invention adapted to be used with the equipment employed in the rotary method of well drilling. In the drawings I have illustrated a well bore W and I have shown the grab provided by the invention operating to grip a lost part or fish F in the bottom of the well bore.

The tool provided by this invention includes, generally, a body 10 adapted to be attached to the lower end of a drilling or operating string D, a stem 11 in the body 10, a plurality of gripping arms 12 pivotally carried by the stem 11, control means 13 operable to release the arms 12 for outward movement upon the tool engaging a stationary object or the fish F, fluid pressure means 14 for operating the arms 12 downwardly from the body, means 15 for urging or forcing the arms 12 inwardly into gripping engagement with the fish F, means 16 for setting or holding the arms 12 in the gripping position, means 17 for indicating that the gripping arms 12 have been actuated, and means 18 for returning the stem and arms 12 to their normal unactuated positions and for operating the stem and arms in or through the body to prepare the tool for use.

The body 10 is an elongated part adapted to be attached to the lower end of an operating string D, such as a string of drill pipe, or the like. The body 10 is provided to carry the various parts of the tool and may be of any suitable construction. In the particular case illustrated the body is sectional, being formed of an upper section 19 and a lower section 20. The upper section 19 is a vertically arranged tubular part and is closed at its upper end by a head or cap 21. The upper section 19 may be attached to the operating string D in any suitable manner. I have shown a tubular connecting member 22 extending through an opening 23 in the head 21 and having a tapered screw threaded pin 24 projecting upwardly from the head to facilitate its attachment to the operating string D. The connecting member 22 may be rotatable in the opening 23 and an enlargement may be provided on the member 22 below the head 21 to engage the lower side of the head. A nut or collar 25 may be screw threaded on the member 22 to engage the upper side of the head 21. Means may be provided to yieldingly resist rotation of the body 10 relative to the operating string D. The lower side of the collar 25, which engages the head 21, may be roughened or provided with teeth to frictionally engage the head 21 to resist relative rotation between the operating string D and the body 10.

The lower section 20 of the body 10 may be screw threaded into the lower end of the upper section 19 and is an elongated part of substantially tubular configuration. The greater part of the section 20 is preferably of larger diameter than the upper section 19. A plurality of longitudinal slots or openings 26 are provided through the walls of the lower section 20. The slots 26 are preferably comparatively long and may extend from adjacent the upper end of the section 20 to the lower end of the section. The slots 26 are circumferentially spaced and provide the body with spaced depending arms or parts 27. The slots 26 are preferably open at the bottom of the body. A plate 28 is provided at the lower end of the lower section 20. The plate 28 may be screw threaded to the spaced parts 27 of the body and consists of a central hub portion and radial portions 29 which register with and are secured to the parts 27 of the body.

The stem 11 is provided to carry the arms 12 and the means 14 and is longitudinally arranged in the body. The stem 11 is a tubular part and is preferably centrally or axially disposed within the body 10. The upper end of the stem 11 is in communication with the interior of the upper body section 19. The stem 11 is comparatively long and is mounted within the body for longitudinal movement. A plate or disk 30 is provided on the stem 11 adjacent its lower end.

The gripping arms 12 are pivotally carried by the stem 11 and are provided to engage and grip the fish F. In accordance with the invention the arms 12 are normally wholly or entirely arranged within the body 10 and their free ends are operable outwardly from the body, then downwardly, and then inwardly into gripping positions. The arms 12 are pivotally carried by the stem 11 and normally depend within the body from their upper ends. There may be any desired number of arms 12, it being preferred that there be a corresponding number of slots 26 and gripping arms 12. The upper ends of the arms are pivotally attached to a sleeve 31 slidably mounted on the lower portion of the stem 11. The sleeve 31 is slidably on the stem 11 between the disk 30 and a nut 32 on the extreme lower end of the stem 11. The upper end portions of the arms 12 are arranged in radial slots in the peripheral portion of the sleeve 31 and may be pivotally connected with the sleeve by pivot pins 33 extending transversely through the slots.

The arms 12 project above the upper side of the sleeve 31 and the upper ends of the arms are curved or made with rounded cam faces. The lower side of the disk 31 is provided with an annular cam face 37 to cooperate with the upper ends of the arms 12. The ends of the arms 12 and the cam faces 37 are formed and related so that upon their engagement or cooperation the free ends of the arms 12 are swung outwardly through the slots 26. The arms 12 are comparatively long and the inner sides of the lower portions of the arms may be provided with gripping parts or teeth.

A cam or wedge part 34 is provided on each arm 12. The parts 34 are provided on the outer sides of the arms 12 and project laterally from the opposite sides of the arms. The cam or wedge parts 34 are provided with outer upwardly and outwardly tapered faces. The arms 12 are positioned inwardly of or opposite the slots 26 of the body as illustrated in the drawings. The arms 12 are arranged and proportioned so that their free ends are adapted to pass or swing outwardly through the slots 26 when released by the means 13. The laterally projecting portions of the wedge parts 34 engage the inner sides of the depending parts 27 of the body to limit the outward movement of the arms 12.

Springs 36 may be attached to the sleeve 31 to normally yieldingly urge the arms 12 outwardly. The springs 36 may be in the nature of leaf springs and there may be a spring 36 provided to engage each of the arms 12. The springs 36 may project downwardly from the sleeve 31 and may be curved and formed so that their lower ends engage the inner sides of the arms 12 to urge or swing the depending arms 12 outwardly.

The control means 13 is provided to release the arms 12 for outward movement and downward operation upon the tool engaging the fish F or other stationary part while being lowered through the well bore W. The control means 13 also operates to indicate to the operator that the arms 12 have been released so that he may operate the fluid pressure means 14. The control means 13 includes a pilot plate or lower plate 38 arranged below the body plate 28, an upper plate 39 above the body plate 28, and a central connecting part 40 extending through an opening 41 in the body plate and connecting the lower and upper plates 38 and 39.

The pilot plate 38 is adapted to engage the fish F and is normally spaced below the body plate 28. The pilot or lower plate 38 consists of a hub portion 42 and spaced radially projecting arms 43. The upper plate 39 is similar in construction to the lower plate 38 having a hub portion 44 and radial arms 45. The upper plate 39 normally rests upon the upper side of the body plate 28 and normally carries or supports the lower ends of the gripping arms 12. The connecting part 40 is slidably and rotatable in the central opening 41 of the body plate 28 so that the spaced plates 38 and 39 are movable relative to the body 10. The upper plate 39 has a radial arm 45 to carry each of the gripping arms 12. A projection or stop 46 is provided at the outer end of each radial arm 45 to normally hold a gripping arm 12 against outward movement. The lower ends of the gripping arms 12 are supported on beveled or inclined faces 47 on the plate arms 45. The inclined faces 47 are formed so that downward movement of the body 10 and the arms 12, relative to the paltes 38 and 39 when the plates are held stationary, causes the plates to turn or rotate so that lower ends of the arms slide or operate off the radial arms 45 of the plate 39. The plates 38 and 39 are set in the same rotative positions so that upon movement of the arms from the plate 39 the arms are free to pass downwardly between the arms 45 of the plate 39, between the radial arms 29 of the body plate 28, and between the radial arms 45 of the pilot plate 38, to project from the lower end of the body, as illustrated in Fig. 4 of the drawings.

A central upwardly projecting tubular member 48 is provided on the connecting part 40 to project above the upper plate 39. The tubular member 48 carries a wash pipe 49 which extends into the lower end of the stem 11. The wash pipe 49 is slidable in the opening of the stem 11 and receives circulation fluid from the stem. The central opening 50 of the tubular part 48 communicates with lateral or branch passages 51 in the connecting part 40. The branch passages 51 normally communicate with discharge opennigs 52 in the body plate 28 when the parts are in the unactuated position, that is, when the plate 38 is spaced below the body plate 28. During the lowering of the tool into the well and before the pilot plate 38 strikes the fish F, the circulation fluid may be discharged downwardly from the discharge passages 52. Upon the pilot plate 38 engaging the fish and upon continued downward movement of the body 10, the passages 52 are moved out of register with the lateral passages 51 so that the circulation of fluid is stopped. The gripping arms 12 are shifted from the inclined faces 47 of the plate 38 when the plate 39 engages the fish. The cutting off of the circulation fluid through engagement of the plate 38 with the fish indicates to the operator that the tool is in position where the arms 12 are adapted to be operated to grip the fish. The arms are ordinarily shifted from the plate 39 upon downward movement of the body relative to the plate. However, if necessary the body 10 may be partially rotated to shift the gripping arms 12 from behind the stops 46 so that they are free to be forced or swung outwardly by the springs 36.

The fluid pressure means 14 is provided to operate the gripping arms 12 downwardly when they are released to the out positions in the slots 26. The fluid pressure means 14 includes a piston 53 on the upper end of the stem 11 slidably in the upper section 19 of the body 10. The piston 53 may carry packing 54 to slidably seal with the interior of the body section 19. The piston 53 is provided with a central opening 55 communicating with the stem 11. In accordance with the invention means is provided for limiting the downward movement of the piston 53. A stop plate 56 is arranged in the body 10 and carries an upwardly projecting bolt 57. The bolt 57 is adapted to be engaged by the lower side of the piston 53 and limits the downward movement of the piston. When the circulation of fluid through the tool is cut off by the control means 13 pressure may be applied to the fluid in the operating string D to depress the piston 53. Upon downward movement of the piston 53 the gripping arms 12 are operated downwardly in the slots 26. The wedge or cam parts 34 slidably engage the inner sides of the depending body parts 27 during downward movement of the arms 12 and limit the extent of outward movement of the lower portions of the arms.

The means 15 for forcing or operating the lower gripping portions of the arms 12 into gripping engagement with the fish F includes, the wedge parts 34 on the arms 12, and cam or wedge parts 60 to cooperate with the wedge parts 34 to force the lower ends of the arms inwardly. The wedge parts 60 may be carried on the body portions 27 above the upper side of the plate 39. The wedge parts 60 are provided on the inner sides of the body portions 27 and are provided with upwardly and outwardly inclined faces which are adapted to receive or cooperate with the inclined faces of the wedge parts 34 to urge the lower ends of the arm parts 12 into gripping engagement with the fish F, as clearly illustrated in Fig. 4 of the drawings. The relative movement between the body 10 and the arms 12 to bring the wedge parts 34 and 60 into cooperative engagement may be caused wholly by the fluid pressure means 14 or may be caused by upward movement of the body 10, after the gripping arms 12 have been partially operated by the fluid pressure means and are in engagement with the fish F or the bottom of the well bore, as illustrated in Fig. 3 of the drawings.

The means 16 for setting or locking the gripping arms 12 in their actuated positions may be in the nature of ratchet means. The means 16 may include a pivoted ratchet 70 carried by the body 10 and adapted to cooperate with ratchet teeth formed on the stem 11 to prevent upward movement of the stem 11 relative to the body 10. The ratchet 70 may be carried by a pivot bolt 71 extending between spaced parts of a block 72 attached to the inner side of the lower section 20 of the body. The pivot pin 71 may be formed of cast iron or other material that will sheer or fail upon being subjected to an excessive strain, so that the arms 12 may be released for upward movement through the sheering of the pin 71 in the event that the gripping arms 12 are in gripping engagement with a fish that cannot be loosened or withdrawn from the well bore. A leaf spring 73 may be provided to yieldingly urge the ratchet 70 into cooperative engagement with the ratchet teeth of the stem 11.

The means 17 indicates to the operator that the gripping arms 12 have been fully actuated or actuated into gripping engagement with the fish F and operates to release or discharge the circulation fluid from the stem 11 and the operating string D upon the arms 12 reaching their actuated positions. The means 17 includes a valve member 61 slidably carried on the tubular member 48. The valve member 61 may be tubular and may surround the member 48. The valve member 61 is provided with lateral openings or ports 62 adapted to be brought into register with lateral ports 63 in the tubular part 48 when shifted downward relative to the member 48. The valve 61 is normally held in an up position, where the ports 62 are out of register with the ports 63, by a spring 64 arranged under compression between the valve 61 and the upper side of the plate 69. The spring 64 also acts to yieldingly hold the plates 38 and 39 in their normal down or unactuated positions.

In the preferred form of the invention the exterior of the tubular member 48 is made upwardly divergent and the opening of the valve 61 is correspondingly shaped so that the spring 64 normally operates to hold the valve 61 in a position where circulation fluid is prevented from leaking or passing between the members 48 and 61. A guide rod 65 may project upwardly from the plate 39 and slidably operate through an eye bolt 66 on the valve 61 to retain the valve 61 in its proper rotative position where the ports 62 are in vertical alignment with the ports 63. Upon the stem 11 being operated to its down position, the nut 32 at the lower end of the stem 11 engages the valve 61 to shift the valve downward to bring the ports 62 into register with the ports 63. With the valve 61 in its down position, circulation fluid is free to discharge from the ports 62, indicating to the operator that the device has been fully actuated. The circulation fluid in the operating string D may discharge through the ports 62 when the grab is withdrawn or pulled from the well bore.

The means 18 for returning the stem 11 and the gripping arms 12 to their normal unactuated positions after the tool has been actuated and withdrawn from the well bore may be employed to operate the stem and other parts in or through the body to prepare the tool for use. The means 18 includes a pinion 80 mounted on the body 10 and adapted to mesh with gear teeth 81 on the stem. The pinion 80 may be mounted on a shaft 82 carried by spaced yoke parts of a block 83 mounted on the inner side of the lower section 20 of the body. The pinion 80 is preferably located diametrically opposite the ratchet 70. The shaft 82 projects outwardly from one side of the block 83 and the projecting portion may be made polygonal to be readily engaged or gripped to rotate the pinion 80.

The various parts of the tool or grab are set in their unactuated positions as illustrated in Fig. 1 prior to lowering the tool into the well bore W for use. The tool is lowered through the well bore until the pilot plate 38 engages or comes into contact with the fish F and the body 10 moves downwardly relative to the plate 38. With the parts in this position, the passages 51 are out of register with the discharge passages 52 so that the circulation of fluid is stopped. Further, the downward movement of the body 10 relative to the plates 38 and 39 causes the plates to rotate and move longitudinally relative to the body so that the lower ends of the gripping arms 12 slip or move off the inclined faces 47 of the plate 39. In the event that the plates are held stationary through engagement with a fish, the body 10 may be partially rotated to move the arms 12 off the faces 47. The springs 36 swing the gripping arms 12 outwardly through the body slots 26. The cam face 37 of the disk 30 cooperates with the upper ends of the gripping arms to aid in moving or swinging the free ends of the arms outwardly. Pressure may then be applied to circulation fluid in the operating string D to depress the piston 53 and shift the gripping arms 12 downwardly. In the event that the gripping arms engage the bottom of the well or other obstruction before they are operated to their lowermost position by the fluid pressure means 14, the body 10 may be raised. Upon the gripping arms being brought to their lowermost position relative to the body 10, the wedge parts 34 and 60 of the means 15 force the lower ends of the arms inwardly or toward one another to effectively grip the fish F. With the arms 12 in their lowermost positions, the nut 32 on the stem 11 engages the valve 61 and holds the valve 61 in a position where the lateral ports 62 are in register with the ports 63 of the tubular member 48. The release or discharge of the circulation fluid through the ports 62 and 63 may indicate to the operator that the device has been fully actuated. The tool may then be withdrawn or pulled from the well bore to remove the fish F. It will be noted that the circulation fluid remaining in the operating string D after operation of the tool will discharge or flow through the ports 62 and 63. Upon the tool being brought to the surface the gripping arms 12 may be released from the fish F or brought to their normal positions by releasing the ratchet 70 from the stem 11 and rotating the pinion 80.

Having described only a typical preferred form of my invention, I do not wish to limit myself to the specific details set forth, but wish to reserve to myself any changes or variations that may appear to those skilled in the art or fall within the scope of the following claims:

Having described my invention, I claim:

1. A tool of the character described including, gripping arms, means for normally urging the arms radially outward, fluid pressure means for operating the arms downwardly, means for moving the lower ends of the arms inwardly during downward movement, and releasable control means normally holding the arms against movement.

2. A tool of the character described including, a body having a longitudinally slotted wall, gripping arms in the body, means normally urging the arms radially outward, and releasable means normally holding the arms against outward movement through the body slots.

3. A tool of the character described including, a body having a longitudinally slotted wall, gripping arms in the body, means normally urging the arms radially outward, and releasable means normally holdings the arms against outward movement through the body slots releasable through engagement with a stationary object.

4. A tool of the character described including, a body having a longitudinally slotted wall, gripping arms within the body, means urging the arms radially outward, releasable means holding the arms against outward movement through the body slots, and means for shifting the arms longitudinally after actuation of the releasable means.

5. A tool of the character described including, a body having a longitudinally slotted wall, gripping arms in the body, means normally urging the arms radially outward, and releasable means normally holding the arms against outward movement through the body slots, the releasable means including, a part movable relative to the body adapted to engage a stationary object and engaging the arms.

6. A tool of the character described including, a body having a slotted wall, a stem movable longitudinally in the body, gripping arms pivotally attached to the stem, means urging the free ends of the arms outwardly, means for operating the stem through the body to move the arms longitudinally, and means releasably holding the arms against outward movement through the body slots and against longitudinal movement.

7. A tool of the character described including, a body having a slotted wall, a stem movable longitudinally in the body, gripping arms pivotally attached to the stem, means urging the free ends of the arms outwardly, means for operating the stem through the body to move the arms longitudinally, and means releasably holding the arms against outward movement through the body slots and against longitudinal movement including a member movable relative to the body adapted to engage a stationary object and normally engaging the free ends of the arms.

8. A tool of the character described including, a body having a slotted wall, a stem movable longitudinally in the body, gripping arms pivotally attached to the stem and normally within the body, means for urging the free ends of the arms outwardly through the body slots, fluid pressure means for operating the stem to shift the arms longitudinally, there being a circulation passage through the body and stem, and releasable means holding the arms against outward and longitudinal movement and operable upon releasing the arms to stop the circulation through the stem and body.

9. A tool of the character described including, a body having a slotted wall, a stem, gripping arms pivotally attached to the stem and normally within the body, means for urging the free ends of the arms outwardly through the body slots, means for moving the stem to shift the arms longitudinally, there being a fluid passage through the body and stem, means releasably holding the arms against movement both longitudinally and outwardly and operable upon releasing the arms to stop the flow of fluid through the said passage, and means for forcing the free ends of the arms inwardly.

10. A tool of the character described including, a body having a slotted wall, a stem, gripping arms pivotally attached to the stem and normally within the body, means for urging the free ends of the arms outwardly through the body slots, means for moving the stem to shift the arms longitudinally, there being a fluid passage through the body and stem, means releasably holding the arms against movement both longitudinally and outwardly and operable upon releasing the arms to stop the flow of fluid through the said passage, and wedge means for forcing the free ends of the arms inwardly during their longitudinal movement.

11. A tool of the character described including, a body having a slotted wall, a stem in the body, gripping arms pivotally carried by the stem, means for urging the free ends of the arms outwardly through the body slots, means for operating the stem through the body to project the arms below the body, means for urging the free ends of the arms inwardly after their projection below the body, and means controlling the actuation of the arms.

12. A tool of the character described including, a body having a slotted wall, a stem in the body, gripping arms pivotally carried by the stem, means for urging the free ends of the arms outwardly through the body slots, means for operating the stem through the body to project the arms below the body, means for urging the free ends of the arms inwardly after their projection below the body, and means controlling the actuation of the arms including a member projecting below the body and movable relative to the body.

13. A tool of the character described including, a body having a slotted wall, a stem in the body, gripping arms pivotally carried by the stem, means for urging the free ends of the arms outwardly through the body slots, means for operating the stem through the body to project the arms below the body, means for urging the free ends of the arms inwardly after their projection below the body, and means controlling the actuation of the arms including a member projecting below the body and movable relative to the body.

14. A tool of the character described including, a body having a slotted wall, a stem in the body, gripping arms pivotally carried by the stem, means for urging the free ends of the arms outwardly through the body slots, means for operating the stem through the body to project the arms below the body, means for urging the free ends of the arms inwardly after their projection below the body, the body and stem having a circulation opening normally discharging at the lower end of the body, and means releasably holding the arms against outward and longitudinal movement including a member projecting below the body movable relative to the body and carrying the lower ends of the arms and operable through engagement with a stationary object to release the arms and close said opening.

15. A tool of the character described including, a body having a slotted wall, a stem in the body, gripping arms pivotally carried by the stem, means for urging the free ends of the arms outwardly through the body slots, means for operating the stem through the body to project the arms below the body, means for urging the free ends of the arms inwardly after their projection below the body, there being a circulation passage in the body, means releasably holding the arms against outward and longitudinal movement including a member projecting from the body and movable relative to the body and engaging the free ends of the arms operable through engagement with an object to release the arms and close said passage, and means for discharging fluid from the passage after actuation of the arms.

16. A tool of the character described including, a body having a slotted wall, a stem in the body, gripping arms pivotally carried by the stem, means for urging the free ends of the arms outwardly through the body slots, means for operating the stem through the body to project the arms below the body, means for urging the free ends of the arms inwardly after their projection below the body, there being a circulation passage in the body, means releasably holding the arms against outward and longitudinal movement including a member projecting from the body and movable relative to the body and engaging the free ends of the arms operable through engagement with an object to release the arms and close said passage, and means for discharging fluid from the passage after actuation of the arms including a valve adapted to be engaged by the stem.

17. A tool of the character described including, a body having a longitudinally slotted wall, gripping arms within the body, spring means urging the arms radially outward, releasable means holding the arms against outward movement through the body slots, and fluid pressure means for shifting the arms longitudinally after actuation of the releasable means.

18. A tool of the character described including, a body having a slotted wall, a stem movable longitudinally in the body, gripping arms pivotally attached to the stem, means urging the free ends of the arms outwardly, fluid pressure means for operating the stem through the body to move the arms longitudinally, and means releasably holding the arms against outward movement through the body slots and against longitudinal movement.

19. A fishing tool including, a body, a stem within the body, gripping arms pivotally carried by the stem, means for projecting the free ends of the arms outward, releasable means normally holding said projecting means against operation, means for releasing said releasable means, means for operating the stem downward to project the arms downward from the body, means for forcing the free ends of the arms radially inward during downward movement, and means for setting the arms against movement upon their free ends being forced inward.

20. A fishing tool including, a body, a stem within the body, gripping arms pivotally carried by the stem, means for projecting the free ends of the arms outward, releasable means normally holding said projecting means against operation, means for releasing the releasable means, means for operating the stem downward to project the arms downward from the body, means for forcing the free ends of the arms radially inward during downward movement, and ratchet means for holding the stem against upward movement.

In witness that I claim the foregoing I have hereunto subscribed my name this 24th day of February, 1930.

JOSEPH G. FITZPATRICK.